(12) United States Patent
Hamada et al.

(10) Patent No.: US 9,760,322 B2
(45) Date of Patent: Sep. 12, 2017

(54) COMMUNICATION SYSTEM AND IMAGE FORMING APPARATUS

(71) Applicant: FUJI XEROX CO., LTD., Tokyo (JP)

(72) Inventors: Tsutomu Hamada, Kanagawa (JP); Yuuri Miura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/844,588

(22) Filed: Sep. 3, 2015

(65) Prior Publication Data

US 2016/0246552 A1 Aug. 25, 2016

(30) Foreign Application Priority Data

Feb. 25, 2015 (JP) .................................. 2015-035736

(51) Int. Cl.
*G06F 3/12* (2006.01)
*H04L 12/24* (2006.01)
*H04L 12/40* (2006.01)

(52) U.S. Cl.
CPC .......... *G06F 3/1236* (2013.01); *G06F 3/1203* (2013.01); *G06F 3/1229* (2013.01); *G06F 3/1291* (2013.01); *H04L 12/40* (2013.01); *H04L 41/0806* (2013.01)

(58) Field of Classification Search
CPC .... G06F 3/1236; G06F 3/1239; G06F 3/1205; G06F 3/1291; H04L 41/0806
USPC ........................................................ 358/1.15
See application file for complete search history.

(56) References Cited

U.S. PATENT DOCUMENTS

| | | | | |
|---|---|---|---|---|
| 7,747,804 B2* | 6/2010 | Wang | .................... | H04L 12/403 710/105 |
| 2003/0048472 A1* | 3/2003 | Perdu | ................. | G03G 15/5075 358/1.15 |
| 2009/0177824 A1* | 7/2009 | Wang | .................... | H04L 12/403 710/110 |

FOREIGN PATENT DOCUMENTS

| | | |
|---|---|---|
| JP | 2000-092083 A | 3/2000 |
| JP | 2010-218351 A | 9/2010 |
| JP | 2010-258796 A | 11/2010 |
| JP | 2011-061481 A | 3/2011 |

\* cited by examiner

*Primary Examiner* — Kent Yip
(74) *Attorney, Agent, or Firm* — Oliff PLC

(57) ABSTRACT

Provided is a communication system including a master device that transmits a signal transmitted from an upstream side to a downstream side, and plural slave devices connected in series to the downstream side of the master device, wherein the slave devices include a communications port that communicates with the upstream side and at least one communications port that communicates with the downstream side, and the master device sequentially sets identification information that identifies the slave device from another slave device from the upstream side to the downstream side by sequentially transmitting a setting information towards all of the plural slave devices.

8 Claims, 7 Drawing Sheets

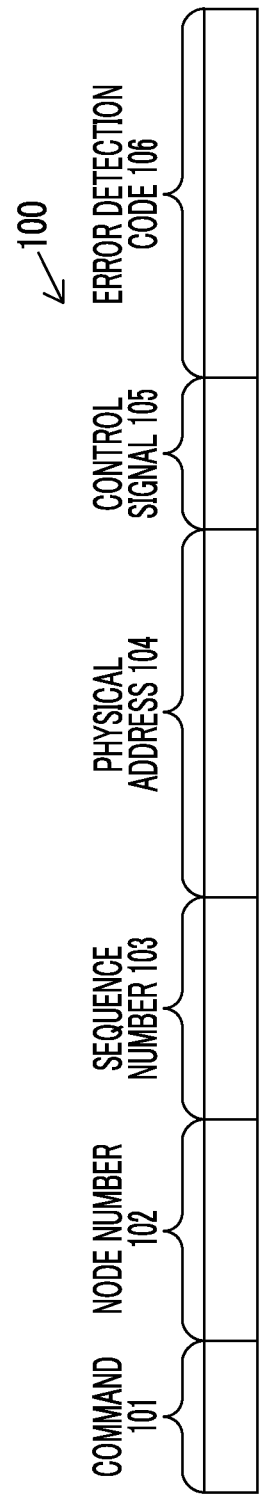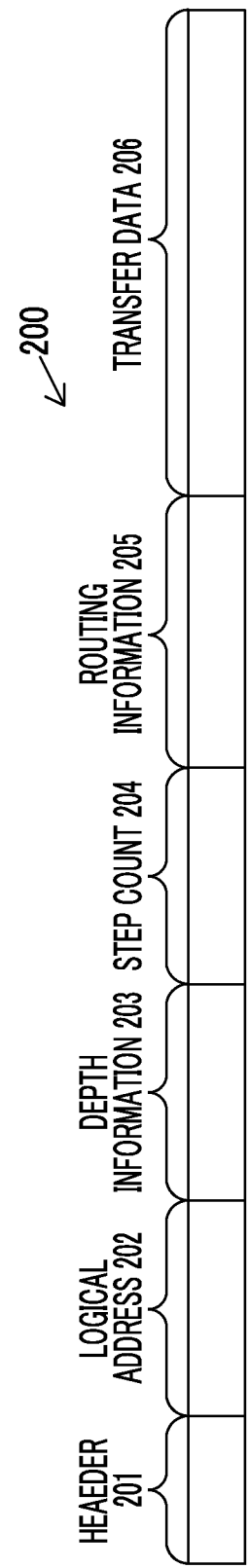

| PHYSICAL ADDRESS | NAME | CONTROL SIGNAL |
|---|---|---|
| 0000h | NODE NUMBER | 0h : UNUSED |
| | | 1h TO 30h : NODE ID |
| | | 31h : BROADCAST(INITIAL VALUE) |
| 0004h | ACCESS CONTROL | 0h : NO ACCESS CONTROL |
| | | 1h : RESTRICT WRITE ACCESS |
| 0008h | PORT 42 CONTROL | 0h : CLOSE PORT 42 |
| | | 1h : OPEN PORT 42 |
| 000Ah | PORT 43 CONTROL | 0h : CLOSE PORT 43 |
| | | 1h : OPEN PORT 43 |

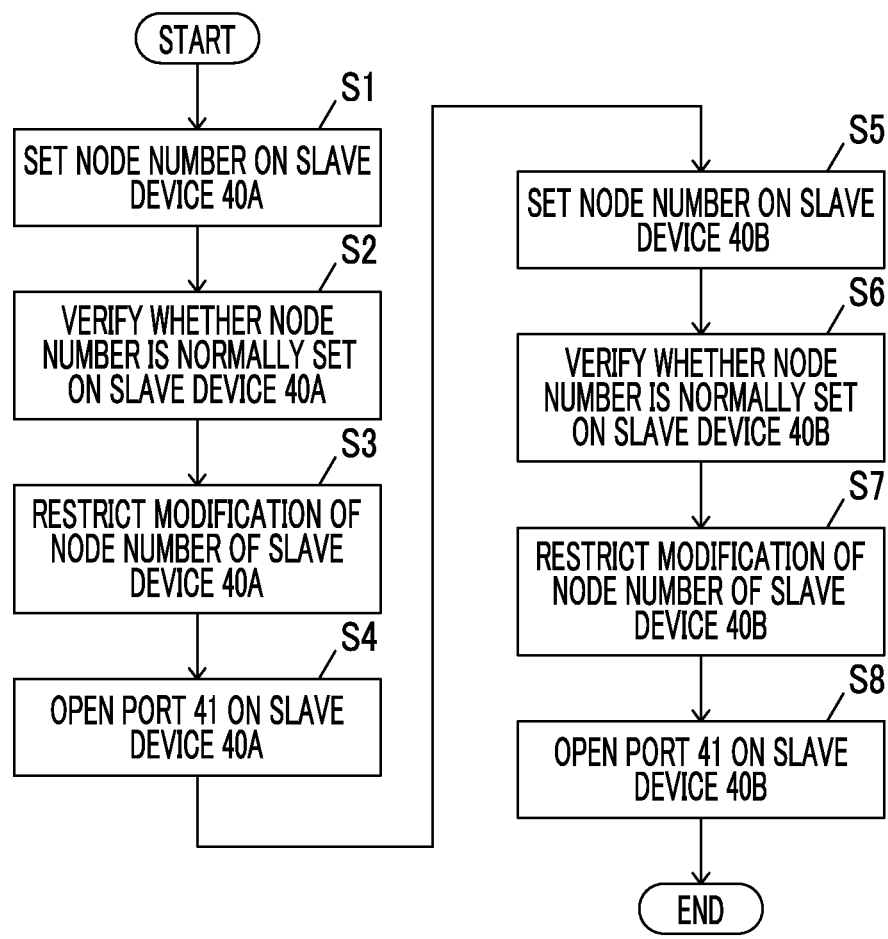

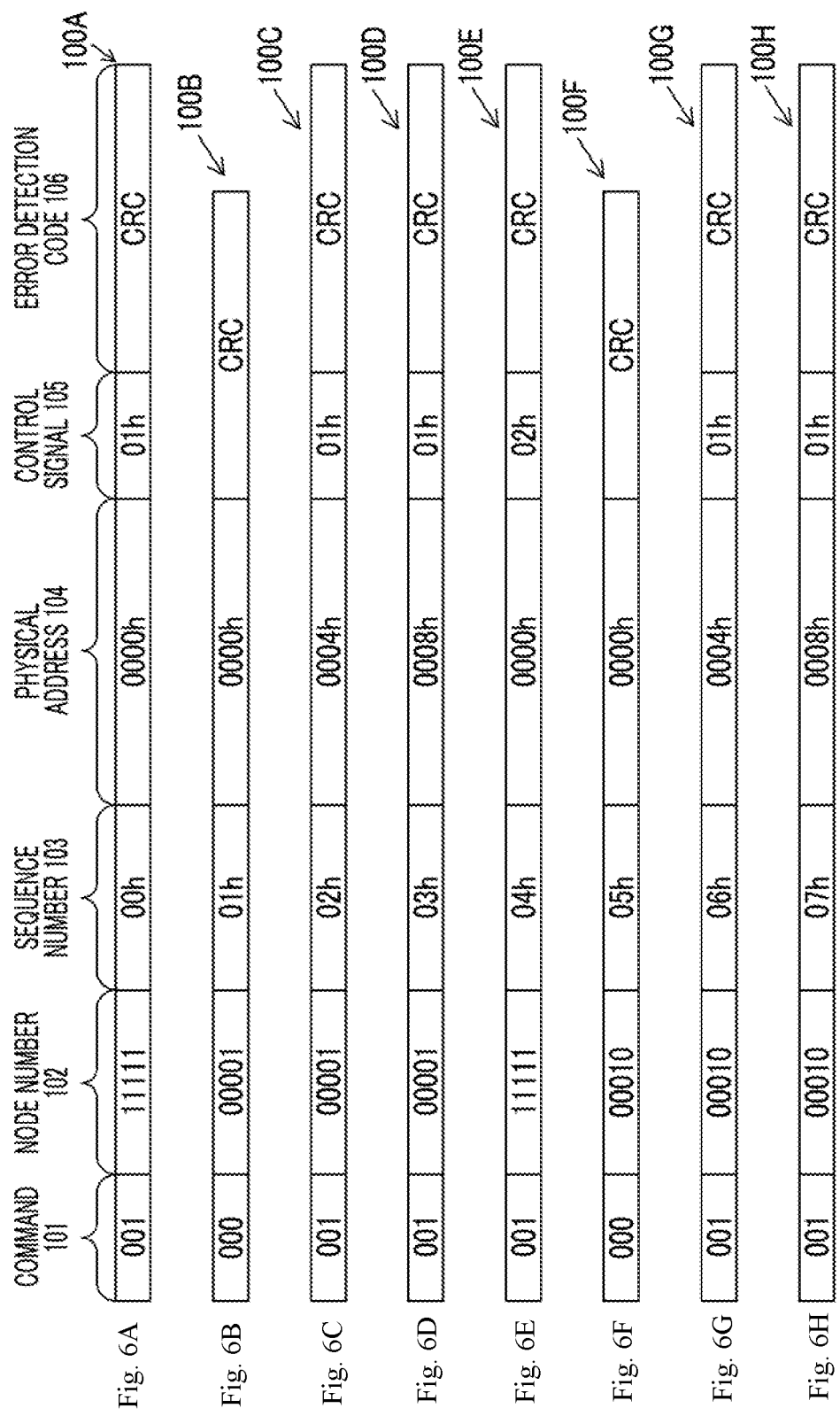

COMMUNICATION SYSTEM AND IMAGE FORMING APPARATUS

CROSS-REFERENCE TO RELATED APPLICATIONS

This application is based on and claims priority under 35 USC 119 from Japanese Patent Application No. 2015-035736 filed on Feb. 25, 2015.

BACKGROUND

Technical Field

The present invention relates to a communication system and an image forming apparatus.

SUMMARY

According to an aspect of the invention, there is provided a communication system including:

a master device that transmits a signal transmitted from an upstream side to a downstream side; and plural slave devices connected in series to the downstream side of the master device, wherein the slave devices include a communications port that communicates with the upstream side and at least one communications port that communicates with the downstream side, and the master device sequentially sets identification information that identifies the slave device from another slave device from the upstream side to the downstream side by sequentially transmitting a setting information towards all of the plural slave devices, restricts modifications of the identification information with respect to the slave device for which the identification information is set after setting the identification information for any of the slave devices for which the identification information is not set, and opens the communications port for allowing the setting information to pass through the another slave device on the downstream side of the slave device.

BRIEF DESCRIPTION OF THE DRAWINGS

Exemplary embodiments of the present invention will be described in detail based on the following figures, wherein:

FIG. 2A is a diagram showing an example of a packet used when the master device according to the exemplary embodiment sets a node number on a slave device, and FIG. 2B is a diagram showing an example of a packet used when a master device in a related art example sets a node number on a slave device;

FIG. 5 is a flowchart showing an example of an operation of the communication system according to the exemplary embodiment;

FIGS. 6A to 6H are diagrams showing an example of a packet transmitted from a master device to a slave device when a node number is set on the slave device;

FIGS. 8A and 8B illustrate a modification example of the invention in which FIG. 8A is a diagram showing an example of a connection mode of the slave device, and FIG. 8B is a diagram showing an example of a node number set on the slave device.

DETAILED DESCRIPTION

Figure 1:
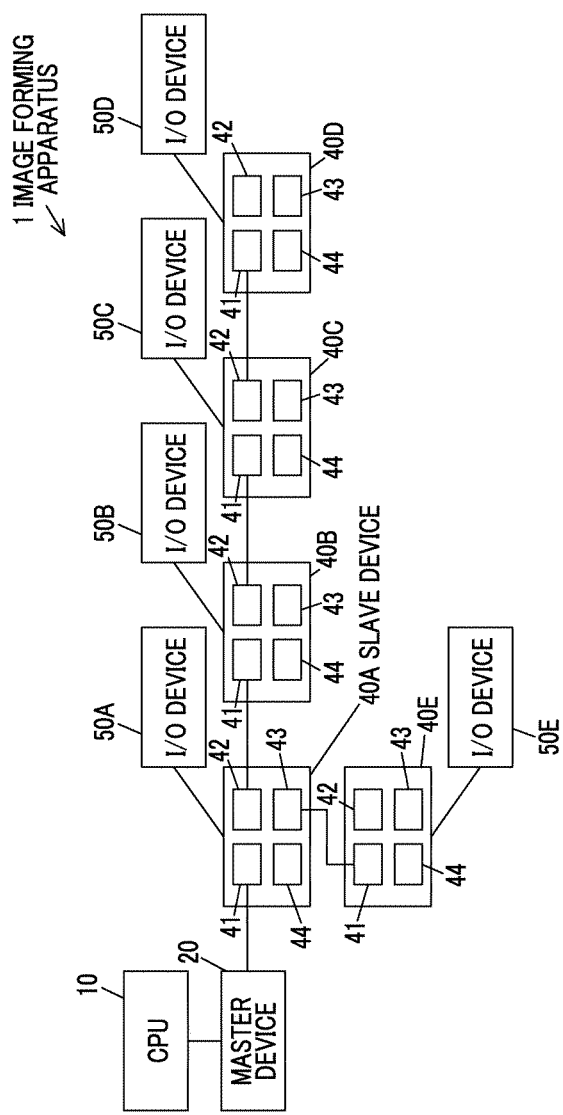
FIG. 1 is a block diagram showing a schematic configuration example of an image forming apparatus to which the communication system according to an exemplary embodiment of the invention is applied.

Below, exemplary embodiments of the invention are described with reference to the drawings. In each drawing, constituent elements having substantially the same function are given the same reference numerals and overlapping description will not be provided.

Exemplary Embodiment

FIG. 1 is a block diagram showing a schematic configuration example of an image forming apparatus to which the communication system according to an exemplary embodiment of the invention is applied.

Configuration of Overall Image Forming Apparatus

An image forming apparatus 1 is provided with a CPU 10 that generates an apparatus control signal that controls each portion of the image forming apparatus 1, a master device 20 connected to the CPU 10, and that transmits the apparatus control signal generated by the CPU 10 to the downstream side, a slave device 40A connected to the downstream side of the master device 20, and plural slave devices 40B to 40E connected in series or in parallel to the downstream side of the slave device 40A. The CPU 10 is an example of a controller.

The master device 20 includes a function of sequentially setting from the upstream side toward the downstream side a node number as an example of identification information on each of the slave devices 40A to 40E by sequentially transmitting packets to the slave devices 40A to 40E when power for the image forming apparatus 1 is turned on. Each of the slave devices 40A to 40E is identified by the master device 20 with the node number. The packet is an example of a setting information.

The slave devices 40A to 40E may allow a communications port 41 for communicating with an upstream side device to be connected, and are further provided with two communications ports 42 and 43 that allow a packet transmitted from the master device 20 to the slave device connected to the downstream side to pass through. The slave device 40B is connected to the communications port 42 of the slave device 40A as shown in FIG. 1, and the slave device 40E is connected to the communications port 43 of the slave device 40A. The slave device 40C is connected to the communications port 42 of the slave device 40B. The slave device 40D is connected to the communications port 42 of the slave device 40C. Here, the term "communications port" signifies a terminal part on the upstream side or the downstream side connected by communication line 30 that connects the slave devices 40A to 40D on the upstream side to the slave devices 40B to 40E on the downstream side, and is realized by hardware.

The master device 20 sequentially transmits packets to the slave devices 40A to 40E, and writes the value according to the purpose to a predetermined physical address of a memory 44 of the slave devices 40A to 40E according to the type of control information.

The node number is set by the slave devices 40A to 40E writing the value according to the purpose to the predetermined physical address of the memory 44. Modifications to the set node number are restricted and the communications ports 42 and 43 of the slave devices 40A to 40E are opened or closed by the slave devices 40A to 40E writing the value according to the purpose to the predetermined physical address of the memory 44. The setting of the node number, restriction on modifications to the node number, and the opening and closing of the communications ports 42 and 43 are examples of the control information.

The master device 20 and the slave device 40A, and the slave devices 40A to 40E are connected by the communication lines 30. The communication lines 30 are differential signal lines, and include at least one (one pair) of a differential signal line that transfers a packet from the upstream side to the downstream side, and a differential signal line that transfers a packet from the downstream side to the upstream side and from the upstream side to the downstream side.

Here, the term "downstream side" signifies a direction in which the signal is transmitted from the CPU 10 side to the slave device 40A to 40E side. The term "upstream side" signifies the opposite side to the downstream side, that is, a direction in which the signal is transmitted from the slave device 40A to 40E side to the CPU 10 side.

Various connection forms of the slave devices 40A to 40E are considered. In the exemplary embodiment, the four slave devices 40A to 40D are connected in series to the master device 20, and the slave device 40E is connected to the slave device 40A in parallel to the slave devices 40B to 40D. The number and connections of the slave devices are not limited to those disclosed in FIG. 1, and the number of slave devices may be six or more. Three or more communications ports may be provided on the downstream side of one of the slave devices 40A to 40E, and the slave device may be connected to each communications port.

The image forming apparatus 1 is further provided with I/O devices 50A to 50E connected respectively to the slave devices 40A to 40E. The I/O devices 50A to 50E are each devices such as a development system, a transfer system, a fixing system, a paper transport system, and a recording control system. The I/O devices 50A to 50E are examples of an execution portion.

Master Device and Slave Device

Figures 3, 4:
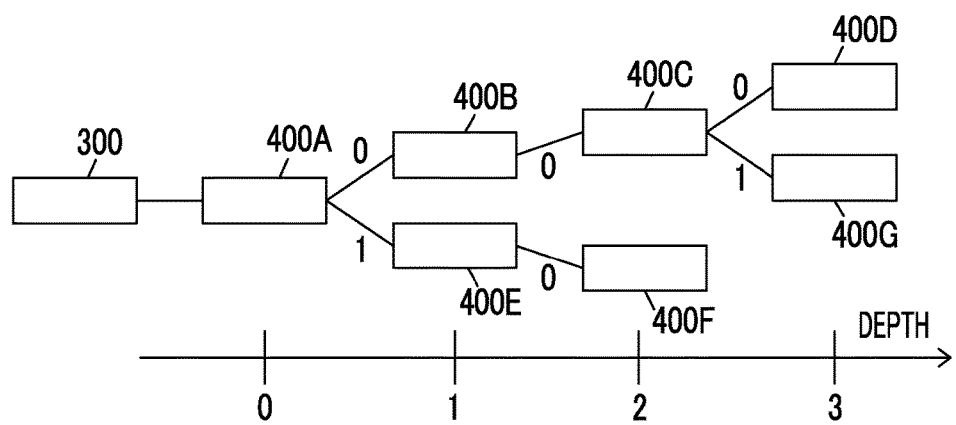
FIG. 3 is diagram for describing each data item included in the packet.
FIG. 4 is a diagram showing a connection structure in a communication system of the related art example.

FIG. 2A is a drawing showing an example of a packet used when the master device 20 according to the exemplary embodiment sets a node number on the slave devices 40A to 40E, and FIG. 2B is a drawing showing an example of a packet used when a master device in a related art example sets a node number on a slave device. FIG. 3 is drawing for describing each data item included in a packet 100. FIG. 4 is a drawing showing a connection structure in the communication system of the related art example.

The packet 100 shown in FIG. 2A includes a command 101, a node number 102, a sequence number 103, a physical address 104, a control signal 105, and an error detection code 106.

In the exemplary embodiment, the master device 20 sets the node number for each of the slave devices 40A to 40E, instructs restrictions on modification of the node number, and controls opening or closing of the downstream side communications ports 42 and 43 by transmitting the packets 100 shown in FIG. 2A to the downstream side. The details of the packet 100 will be described later.

Related Art Example

A packet 200 in the related art example shown in FIG. 2B includes a header 201, a logical address 202, slave device depth information 203, a step count 204, routing information 205, and transfer data 206. In a configuration of the related art example, slave devices 400A to 400G of the target that sets the node number by the depth information 203 and the routing information 205 are provided.

In FIG. 4, the depth "0 to 3" signifies the depth (distance) from a master device 300, the route "0, 1" signifies which route is passed through in a case where two slave devices are connected to the downstream side. For example, in a case of transmitting the packet 200 to the slave device 400E, the master device 300 inserts the depth "2" into the depth information 203, and inserts the route "001" (binary) into in the routing information 205.

In the related art example, in a case where slave devices are added or the like by varying the routing information 205 of the slave devices 400A to 400E according to the number and connection structure of the slave devices, since the depth information 203 and the routing information 205 are re-set so as to correspond to the new connection structure, there is a problem where complicated setting tasks are necessary and the extensibility of the image forming apparatus is poor.

Because the packet 200 of the related art example is configured so that the node number is set using the depth information 203 and the routing information 205, it is necessary to provide in the slave devices 400A to 400G a dedicated circuit for processing the depth information 203 and the routing information 205 by the slave devices 400A to 400G. Therefore, there is a problem of incurring cost increases in the image forming apparatus.

Since the packet 200 of the related art example does not include an error detection code, although an erroneous node number being set on the slave device 400 by generating an error in the packet 200 is predicted, there is a problem that a unit verifying this is not included.

Meanwhile, the packet 100 according to the exemplary embodiment includes the command 101, the node number 102, the sequence number 103, the physical address 104, the control signal 105, and the error detection code 106, as shown in FIG. 2A. By setting the node number on the slave devices 40A to 40E using the packet 100, the node number may be set without having a special mode that sets the node number.

The command 101 in the packet 100 is information for determining whether to be a command for the slave devices 40A to 40E receiving the packet 100 to write the value of the control signal 105 to the memory 44 of the slave devices 40A to 40E or a command for the slave devices 40A to 40E to read out the value written to the memory 44 of the slave devices 40A to 40E.

For example, if the command 101 is "001" (binary), the packet 100 is a command to write the value of the control signal 105 to the memory 44 of the slave devices 40A to 40E, and if the command 101 is "000" (binary), the packet 100 is a command to read out the value written to the memory 44.

When the slave devices 40A to 40E receive the packet 100 including a command to read out the value from the memory 44 from the master device 20, the slave devices reply with the packet 100 in which the value read out from the memory 44 is inserted to the master device 20.

The node number 102 is information that identifies the delivery destination of the packet 100. For example, in a case where the node number 102 is "00001" (binary), the packet 100 is transmitted to the slave device 40A for which the node number 102 "00001" (binary) is set. In a case where the node number 102 is "11111" (binary), the packet 100 is transmitted to all of the slave devices 40A to 40E. In so doing, in a case where a new slave device is added to the connection structure, a new connection structure may be responded to by the master device 20 allocating the node number 102 to the new slave device only. Plural slave devices may be added without the number of switches, such as physical switches, being restricted.

The sequence number 103 is information indicating a series of numbers in which 1 is added to the number each time the packet 100 is transmitted.

The physical address 104 is information designating the physical address of the memory 44 of the slave devices 40A to 40E. The master device 20 sets the node number by writing the value of the control signal 105 to a physical address set in advance of the memory 44 according to the type of control information.

In a case where the physical address 104 is "0000" (hexadecimal), as shown in FIG. 3, the slave devices 40A to 40E set the node number according to the information included in the packet 100. In a case where the physical address 104 is "0004" (hexadecimal), as shown in FIG. 3, the slave devices 40A to 40E perform control (access control) of the restriction or permission of modifications of the node number. In a case where the physical address 104 is "0008" (hexadecimal), as shown in FIG. 3, opening and closing of the communications port 42 is set.

The control signal 105 is the value written to the physical address of the memory 44. As an example, in a case (case where the physical address is "0000" (hexadecimal)) where the control signal 105 sets the node number to the slave devices 40A to 40E as shown in FIG. 4, the information included in the control signal 105 corresponds to the node number set to each of the slave devices 40A to 40E.

The error detection code 106 is a cyclic redundancy check (CRC) code calculated based on each bit included in the packets 100 transmitted by the master device 20. The master device 20, when the packet 100 is transmitted, calculates the error detection code 106 from each bit of the packet 100 and inserts the code in the packet 100, and transmits the packets 100 in which the error detection code 106 is inserted to the slave devices 40A to 40E. By having the error detection code 106, the slave devices 40A to 40E are able to determine whether an error has arisen in the received packet 100.

Operation of Image Forming Apparatus

Figure 7A:
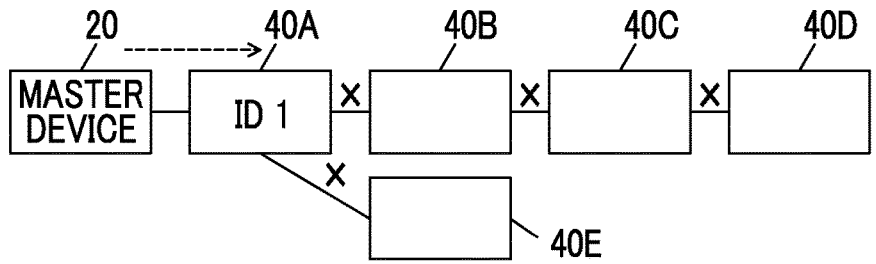
FIGS. 7A to 7C are diagrams showing an arrival state of a packet and a state of a communications port when the node number is set on the slave device.
Figure 7B:
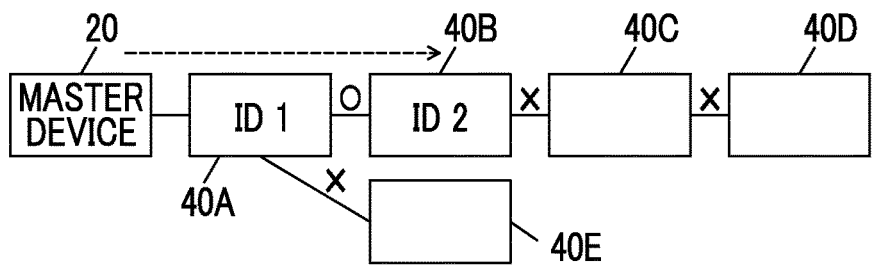
Figure 7C:
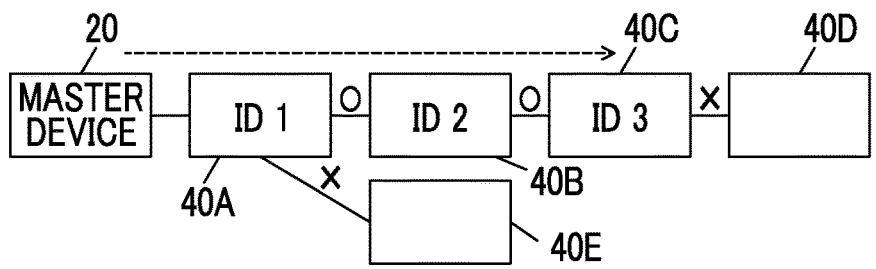

Next, an example of the operation of the image forming apparatus 1 is described. FIG. 5 is a flowchart showing an example of the operation of the communication system according to the exemplary embodiment. FIGS. 6A to 6H are drawings showing an example of a packet transmitted from a packet master device to a slave device when a node number is set on the slave device. FIGS. 7A to 7C are drawings showing an arrival state of a packet and a state of a communications port when the node number is set on the slave device.

In FIGS. 7A to 7C, "O" indicates a state in which the communications ports 42 and 43 are opened, and "X" indicates a state in which the communications ports 42 and 43 are closed. In FIGS. 7A to 7C, the arrow indicates the slave devices 40A to 40E which the packet 100 reaches.

When the power source is turned on in the image forming apparatus 1, the master device 20 sets the node number that identifies each of the slave device 40A to 40E. The initial settings when the power source is turned on are the node number being not set on each of the slave device 40A to 40E, and the communications ports 42 and 43 of the slave devices 40A to 40E being closed.

(1) Setting of Slave Device 40A

The master device 20 transmits a packet 100A that sets the node number of the slave device 40A to "01" (hexadecimal) to all of the slave devices 40A to 40E, and sets the node number on the slave device 40A (S1). At this time, because the communications ports 42 and 43 of the slave device 40A are closed, the packet 100A only reaches the slave device 40A and is received by the slave device 40A only, as shown in FIG. 7A.

That is, when the slave device 40A receives the packet 100A, "01" (hexadecimal) is set as the node number of the device by writing the control signal 105 "01" (hexadecimal) to the physical address of the memory 44 corresponding to the physical address 104 "0000" (hexadecimal).

The slave device 40A calculates the error detection code from the received packet 100A, and requests the master device 20 to transmit the packet 100A again in a case where the calculated error detection code is different to the error detection code 106 included in the packet 100A.

The master device 20 transmits a packet 100B to the slave device 40A, and verifies whether the node number is normally set by reading out the node number set by the slave device 40A (S2). That is, the master device 20 instructs the notification of the node number written to the physical address "0000" (hexadecimal) of the memory 44 by transmitting the packet 100B. The master device 20, when the node number is notified from the slave device 40A, compares the node number 102 transmitted by the packet 100B and the node number notified from the slave device 40A.

In a case where the packet 100 is not transmitted from the slave device 40A or in a case where a different node number to the node number included in the packet 100B is notified from the slave device 40A, the master device 20 sets the node number 102 on the slave device 40A by re-transmitting the packet 100B to the slave device 40A.

When the master device 20 verifies that the node number is set on the slave device 40A, the master device 20 restricts modifications of the node number set on the slave device 40A by transmitting a packet 100C to the slave device 40A (S3).

That is, when the slave device 40A receives the packet 100C, modifications of the node number are restricted by the control signal 105 "01" (hexadecimal) being written to the physical address of the memory 44 corresponding to the physical address 104 "0004" (hexadecimal). In so doing, the slave device 40A does not modify the node number even in a case where the packet 100 modifying the node number is transmitted from the master device 20 to the slave device 40A.

When modification of the node number is restricted by the slave device 40A, the master device 20 transmits a packet 100D to the slave device 40A, and opens the communications port 42 of the slave device 40A (S4).

That is, when the slave device 40A receives the packet 100D, the slave device 40A opens the communications port 42 by writing the control signal 105 "01" (hexadecimal) that instructs the opening of the communications port 42 to the physical address of the memory 44 corresponding to the physical address 104 "0008" (hexadecimal). By the slave device 40A opening the communications port 42, the packet 100 reaches the slave device 40B on the downstream side of the slave device 40A from the master device 20, as shown in FIG. 7B.

(2) Setting of Slave Device 40B

When the slave device 40A opens the communications port 42, the master device 20 transmits a packet 100E for setting the node number "02" (hexadecimal) to all of the slave devices 40A to 40E, and sets the node number "02" (hexadecimal) on the slave device 40B (S5). That is, although the slave device 40A receives the packet 100E, because modification of the node number is restricted, the node number is not modified.

Because the communications port 43 of the slave device 40A and the communications port 42 and 43 of the slave device 40B are closed, the packet 100E does not reach the slave devices 40C to 40E on the downstream side. When the slave device 40B receives the packet 100E, the node number "02" (hexadecimal) is set as the node number of the device based on the control signal 105 included in the packets 100E.

When the slave device 40B sets the node number, the master device 20 transmits a packet 100F to the slave device 40B, and verifies whether the node number is normally set on the slave device 40B by acquiring the node number set on the slave device 40B (S6).

When it is verified that the node number is normally set on the slave device 40B, the master device 20 restricts modifications of the node number by transmitting a packet 100G to the slave device 40B (S7).

When the slave device 40B restricts modification of the node number, the master device 20 opens the communications port 42 of the slave device 40B by transmitting a packet 100H.

When the slave device 40B opens the communications port 42, the packet 100 transmitted from the master device 20 reaches the slave device 40C as shown in FIG. 7C.

Below, although not disclosed in the detailed description, the master device 20 sets the node number for the slave devices 40C to 40E, opens the communications ports 42 and 43, and restricts modification of the node number set through steps similar to S1 to S7.

Modification Example

Figure 8A:
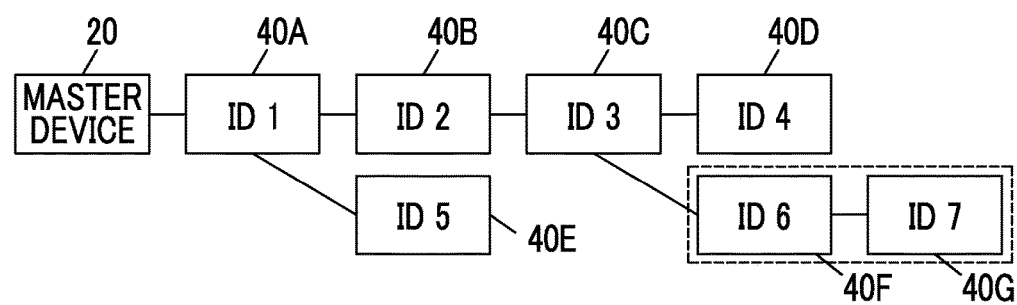
Figure 8B:
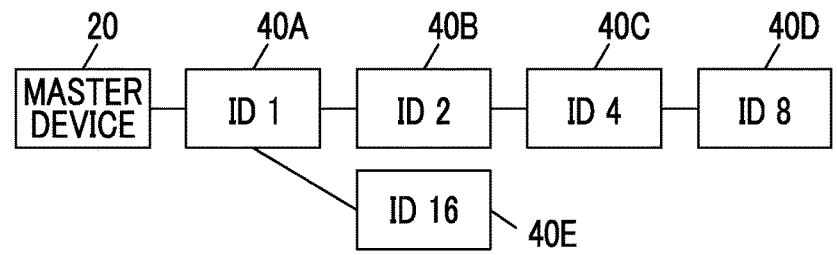

FIGS. 8A and 8B are drawings showing a modification example of the invention, FIG. 8A is a drawing showing an example of a connection mode of the slave device, and FIG. 8B is a diagram showing an example of a node number set on the slave device.

The exemplary embodiments of the invention are not restricted to the above exemplary embodiments, and various modifications and implementations are possible within a range not modifying the gist of the invention. For example, as shown in FIG. 8A, slave devices 40F and 40G may be added, and a function may be added to the image forming apparatus by connecting a post-processing device or the like to the slave devices 40F and 40G.

The node number set on each of the slave devices 40A to 40E is not limited to being continuous, and a number raised by the power of 2 may be used as the node number as shown in FIG. 8B.

Omitting a portion of the constituent elements of the exemplary embodiments is possible, and addition, deletion, modification, substitution and the like of the steps are possible in the flow of the exemplary embodiments within a range not modifying the gist of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system comprising:

a master device that transmits a signal transmitted from an upstream side to a downstream side; and a plurality of slave devices connected in series to the downstream side of the master device so that transmission to a first slave device that is downstream of a second slave device must first be transmitted through the second slave device in order to reach the first slave device, wherein the slave devices include a communications port that communicates with the upstream side and at least one communications port that communicates with the downstream side, wherein one or more of the at least one communications port comprises at least two communications ports that communicates with the downstream side, and wherein all of the at least one communications port are initially closed so that no communications may pass until opened, and the master device sequentially sends packets that each includes, a command, a node number, a physical address, and a control signal for setting identification information that identifies one slave device from another slave device from the upstream side to the downstream side by sequentially transmitting a setting information towards all of the plurality of slave devices at the time that the at least one communications port are initially closed, restricts modifications of the identification information with respect to the one slave device for which the identification information is set after setting the identification information for any of the slave devices for which the identification information is not set, and opens, from a closed position, a downstream communications port of the at least one communications port for allowing the setting information to pass to the another slave device on the downstream side of the one slave device, wherein the node number is information that identifies a delivery destination of a packet of the packets, wherein the command in the packet is information for determining whether to write a value of the control signal to memory of a slave device or to read out a value written to the memory, and the physical address is information designating the physical address of the memory.

2. The communication system according to claim 1, wherein the setting information transmitted by the master device includes an error detection code.

3. An image forming apparatus, comprising:

the communication system according to claim 1;

a controller that is connected to the upstream side of the master device, and that transmits an apparatus control signal that controls the apparatus to the master device; and an execution section comprising at least one I/O device, the execution section is connected to the plurality of slave devices and executes an I/O process based on the signal transmitted from the master device.

4. An image forming apparatus, comprising:
the communication system according to claim 2;
a controller that is connected to the upstream side of the master device, and that transmits an apparatus control signal that controls the apparatus to the master device; and
an execution section comprising at least one I/O device, the execution section is connected to the plurality of slave devices and executes an I/O process based on the signal transmitted from the master device.

5. A communication system comprising:
a master device that transmits a signal transmitted from an upstream side to a downstream side; and
a plurality of slave devices connected in series to the downstream side of the master device so that transmission to a first slave device that is downstream of a second slave device must first be transmitted through the second slave device in order to reach the first slave device,
wherein each of the slave devices include a communications port that communicates with the upstream side and at least two communications ports that communicates with the downstream side, and wherein all of the at least two communications ports are initially closed so that no communications may pass until opened, and
the master device sequentially sends packets that each includes, a command, a node number, a physical address, and a control signal for setting identification information that identifies one slave device from another slave device from the upstream side to the downstream side by sequentially transmitting a setting information towards all of the plurality of slave devices at the time that the at least two communications ports are initially closed, restricts modifications of the identification information with respect to the one slave device for which the identification information is set after setting the identification information for any of the slave devices for which the identification information is not set, and opens, from a closed position, a communications port for allowing the setting information to pass to the another slave device on the downstream side of the one slave device,
wherein the node number is information that identifies a delivery destination of a packet of the packets, wherein the command in the packet is information for determining whether to write a value of the control signal to memory of a slave device or to read out a value written to the memory, and the physical address is information designating the physical address of the memory.

6. The communication system according to claim 5,
wherein the setting information transmitted by the master device includes an error detection code.

7. An image forming apparatus, comprising:
the communication system according to claim 5;
a controller that is connected to the upstream side of the master device, and that transmits an apparatus control signal that controls the apparatus to the master device; and
an execution section comprising at least one I/O device, the execution section is connected to the plurality of slave devices and executes an I/O process based on the signal transmitted from the master device.

8. An image forming apparatus, comprising:
the communication system according to claim 6;
a controller that is connected to the upstream side of the master device, and that transmits an apparatus control signal that controls the apparatus to the master device; and
an execution section comprising at least one I/O device, the execution section is connected to the plurality of slave devices and executes an I/O process based on the signal transmitted from the master device.

* * * * *